United States Patent
Nalbant

(10) Patent No.: US 10,312,736 B2
(45) Date of Patent: *Jun. 4, 2019

(54) WIRELESS POWER TRANSMITTER

(71) Applicant: INTEGRATED DEVICE TECHNOLOGY, INC., San Jose, CA (US)

(72) Inventor: Mehmet K. Nalbant, Cupertino, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 97 days.

This patent is subject to a terminal disclaimer.

(21) Appl. No.: 15/206,439

(22) Filed: Jul. 11, 2016

(65) Prior Publication Data

US 2017/0163095 A1    Jun. 8, 2017

Related U.S. Application Data

(63) Continuation of application No. 14/872,483, filed on Oct. 1, 2015.

(51) Int. Cl.
| | |
|---|---|
| *H02J 5/00* | (2016.01) |
| *H02J 7/02* | (2016.01) |
| *H01F 38/14* | (2006.01) |
| *H02J 50/12* | (2016.01) |

(52) U.S. Cl.
CPC ........... *H02J 50/12* (2016.02); *H01F 38/14* (2013.01); *H02J 7/025* (2013.01); *H02J 5/005* (2013.01)

(58) Field of Classification Search
None
See application file for complete search history.

(56) References Cited

U.S. PATENT DOCUMENTS 5,014,176 A * 5/1991 Kelleher, Jr. ........... H02M 1/15
                                                              363/134
5,450,305 A * 9/1995 Boys ....................... G05F 1/13
                                                              219/624

(Continued)

OTHER PUBLICATIONS

Tseng et al. "Introduction to the Alliance for Wireless Power Loosely-Coupled Wireless Power Transfer System Specification Version 1.0," IEEE Wireless Power Transfer Conference 2013, Technologies, Systems and Applications, May 15-16, 2013 Perugia, Italy. pp. 1-6.

(Continued)

*Primary Examiner* — Jared Fureman
*Assistant Examiner* — Joel Barnett
(74) *Attorney, Agent, or Firm* — Haynes and Boone, LLP

(57) ABSTRACT

A wireless power transmission system is presented. In some embodiments, a transmission unit includes a first inductor with a center tap, a first end tap, and a second end tap; a pre-regulator coupled to provide current to the center tap; a switching circuit coupled to the first end tap and the second end tap, the switching circuit alternately coupling the first end tap and the second end tap to ground at a frequency; and a resonant circuit magnetically coupled to the first inductor, the resonant circuit wirelessly transmitting power. In some embodiments, the switching circuit can be formed of FETs. The current provided to the center tap can be controlled in response to current sensors.

11 Claims, 11 Drawing Sheets

(56) References Cited

U.S. PATENT DOCUMENTS

| | | | | |
|---|---|---|---|---|
| 5,892,666 | A * | 4/1999 | Gucyski | H02M 1/425 363/134 |
| 6,321,531 | B1 * | 11/2001 | Caren | B01D 53/90 204/168 |
| 2010/0109443 | A1 * | 5/2010 | Cook | H01Q 1/2225 307/104 |
| 2010/0148723 | A1 * | 6/2010 | Cook | G06K 7/0008 320/108 |
| 2010/0184371 | A1 * | 7/2010 | Cook | H02J 5/005 455/41.1 |
| 2011/0049997 | A1 * | 3/2011 | Urano | H02J 5/005 307/104 |
| 2011/0148373 | A1 * | 6/2011 | Canfield | H02M 3/1582 323/282 |
| 2014/0113689 | A1 * | 4/2014 | Lee | H04W 52/0277 455/573 |
| 2015/0084586 | A1 * | 3/2015 | Von Novak, III | H02J 7/025 320/108 |

OTHER PUBLICATIONS

Grajski et al. "Loosely-Coupled Wireless Power Transfer: Physics, Circuits, Standards," Microwave Workshop Series on Innovative Wireless Power Transmission: Technologies, Systems and Applications (IMWS), 2012, IEEE MTT-S International, DOI: 10.1109/IMWS.2012.6215828. pp. 1-7.

* cited by examiner

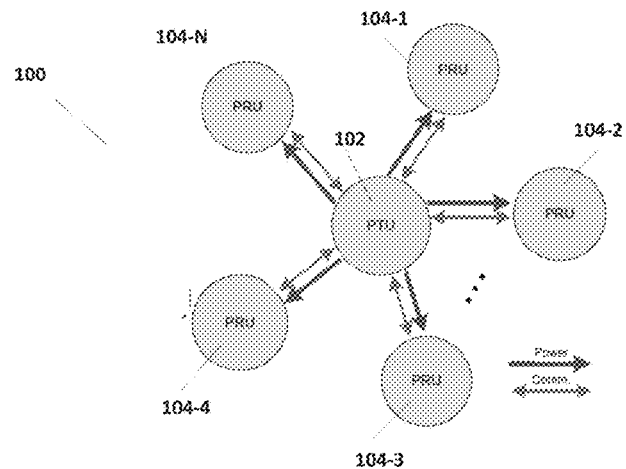
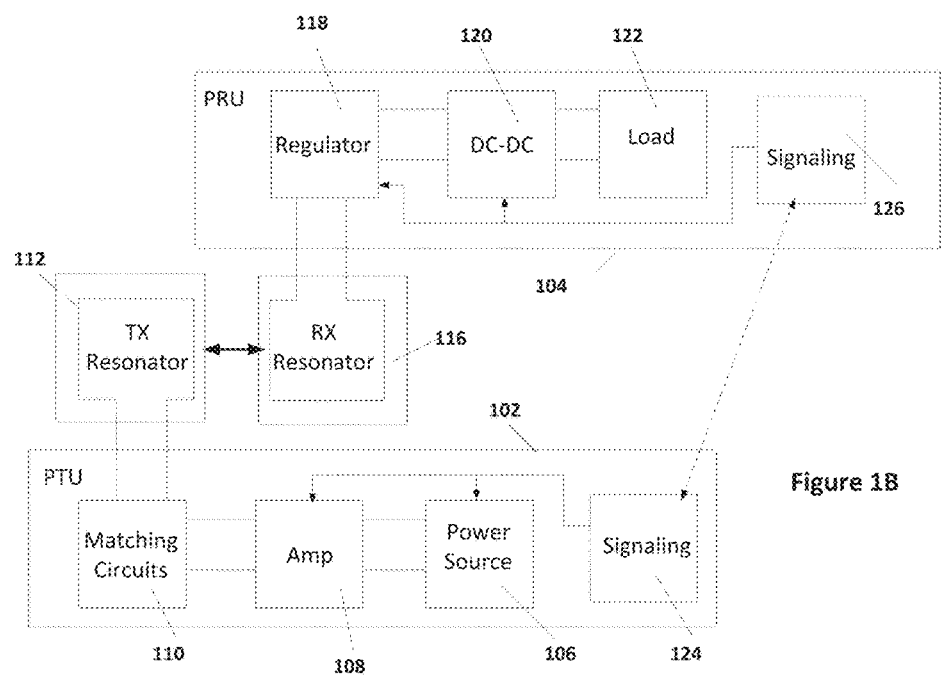
Figure 1A
Figure 1B

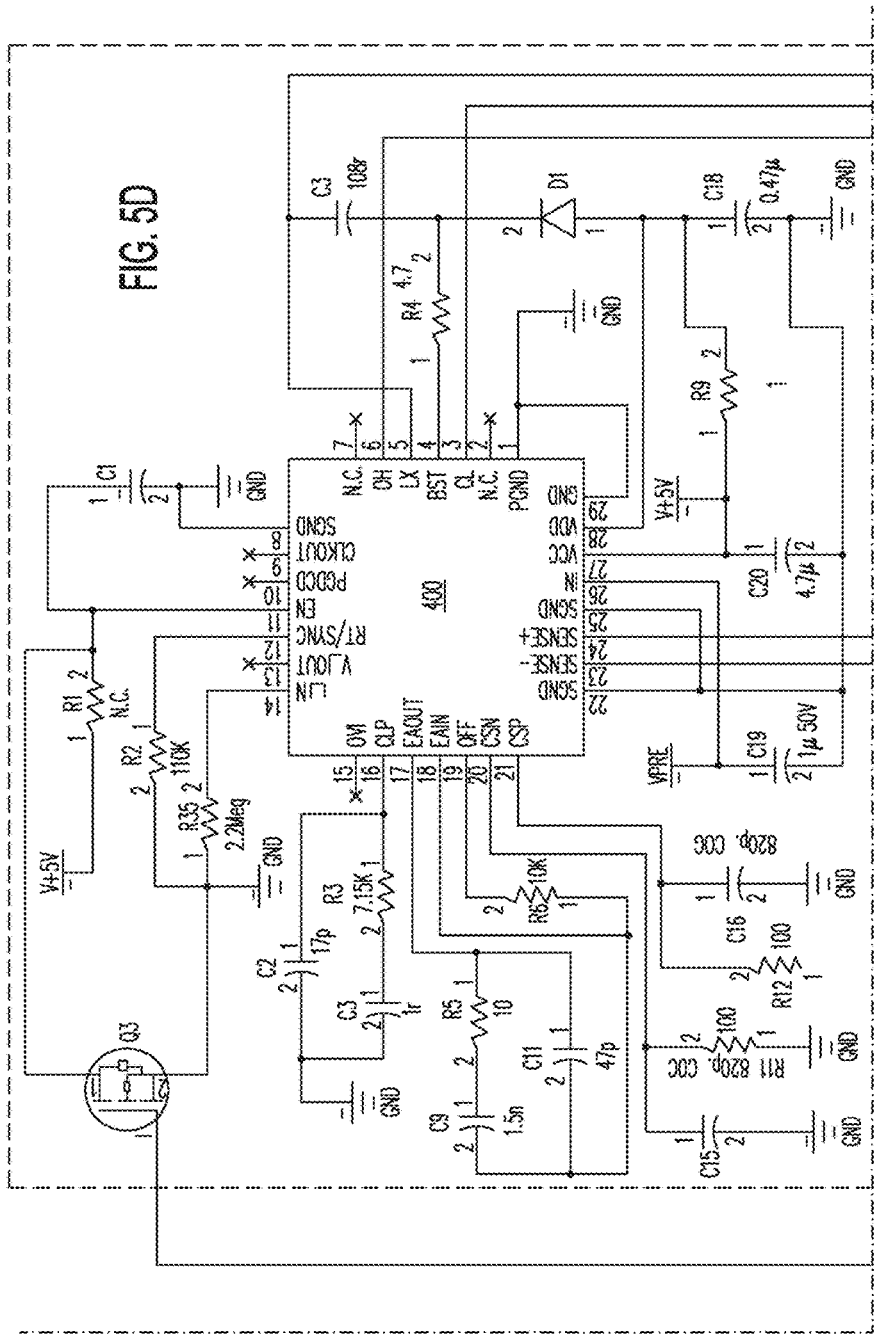

WIRELESS POWER TRANSMITTER

CROSS-REFERENCE TO RELATED APPLICATIONS

This application is a continuation of U.S. patent application Ser. No. 14/872,483, filed Oct. 1, 2015, entitled "WIRELESS POWER TRANSMITTER", incorporated herein by reference.

TECHNICAL FIELD

Embodiments of the present invention are related to wireless power transmission.

DISCUSSION OF RELATED ART

Wireless power charges are quickly becoming a widespread and popular method of charging portable devices such as laptop computers, mobile phones, tablets, e-Readers, media players and other devices. A device that includes a wireless receiver can be placed in proximity to a wireless transmitter and become charged without the need of charging cables or other devices. Wireless transmitters can be located in a multitude of locations, including public locations as well as in the home or office environment.

One standard, the Alliance for Wireless Power (A4WP), provides for ubiquitous power availability in multiple environments for loosely-coupled wireless power transmitter systems. In such systems, wireless power transmitters are widely distributed and consumers may charge compatible portable devices by placing them in proximity to the transmitters, for example by placing them on a charging matt. Such systems may support the simultaneous charging of multiple devices that are placed on the charging matt.

Multiple challenges exist in supplying power transmitter technologies in loosely-coupled wireless power transmission systems. These challenges include, for example, efficiently and safely supplying power to particular receiving devices. Therefore, there is a need to develop better wireless charging technologies for charging portable devices.

SUMMARY

In accordance with aspects of the present invention a wireless power transmission system is disclosed. In some embodiments, a transmission unit includes a first inductor with a center tap, a first end tap, and a second end tap; a pre-regulator coupled to provide current to the center tap; a switching circuit coupled to the first end tap and the second end tap, the switching circuit alternately coupling the first end tap and the second end tap to ground at a frequency; and a resonant circuit magnetically coupled to the first inductor, the resonant circuit wirelessly transmitting power.

In some embodiments, a resonant transmission unit includes a first inductor with a center tap, a first end tap and a second end tap; a first transistor coupled between the first end tap and a ground; a second transistor coupled between the second end tap and the ground; a pre-regulator coupled to provide current to the center tap; and a resonant circuit magnetically coupled to the first inductor, wherein gates of the first transistor and the second transistor are driven to transmit power with the resonant circuit.

A method of wireless transmission according to some embodiments includes providing current to a center tap of a first inductor; alternately coupling a first end of the first inductor and a second end of the first inductor to ground at a frequency; and magnetically coupling a resonant circuit with the first inductor.

These and other embodiments are further discussed below with respect to the following figures.

BRIEF DESCRIPTION OF THE DRAWINGS

FIGS. 1A and 1B illustrates an example of a wireless power transmission system.

DETAILED DESCRIPTION

Figure 2:
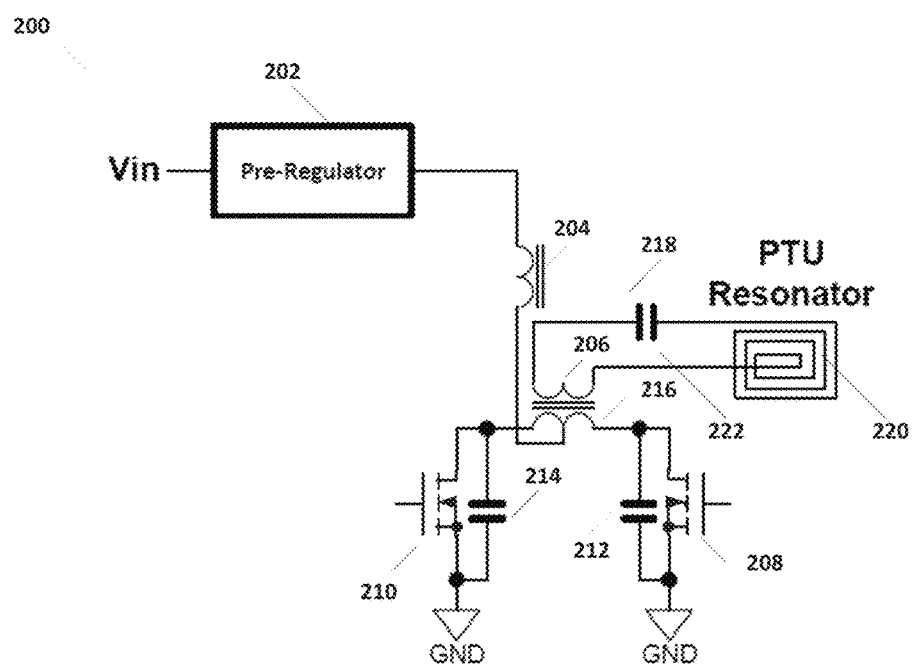
FIG. 2 illustrates a block diagram of a wireless power transmitter according to some embodiments of the present invention.

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Electronic components that are described as single components may include multiple components. For example, a capacitor may be formed of multiple capacitors. Similarly, inductors and resistors may be formed of multiple inductors and resistors, respectively.

FIG. 1A illustrates a wireless charging system 100 in which embodiments of the present invention may be used. System 100 includes a power transmitter unit (PTU) 102. PTU 102 can, in some cases, transmit power to one or more power receive units (PRU) 104-1 through 104-N. System 100 may, for example, conform to the Alliance for Wireless Power (A4WP) standards. A4WP systems utilize loosely-coupled wireless power systems operating at 6.78 MHz for transmission of power from PTU 102 to PRU 104. Furthermore, in the A4WP standard, system communications between PTU 102 and PRU 104 are accomplished, for example, using Bluetooth communications at 2.4 GHz. The A4WP standard is discussed, for example, in Ryan Tseng, Bill von Novak, Sumukh Shevde and Kamil Grajski, "Introduction to the Alliance for Wireless Power Loosely-Coupled Wireless Power Transfer System Specification Version 1.0," IEEE Wireless Power Transfer Conference 2013, Technologies, Systems and Applications, May 15-16, 2013 Perugia, Italy. Loosely-coupled wireless power transfer is further described in Kamil Grajski, Ryan Tseng and Chuck Wheatley, "Loosely-Coupled Wireless Power Transfer: Physics, Circuits, Standards," Microwave Workshop Series on Innovative Wireless Power Transmission: Technologies, Systems and Applications (IMWS), 2012, IEEE MTT-S International, DOI: 10.1109/IMWS.2012.6215828.

Embodiments of the present invention may operate within the A4WP standard. However, embodiments are not restricted to do so and may operate in conformance with other requirements. For example, embodiments of the present invention may operate within different frequency ranges and may support other communication methods to transmit data and instructions between PTU 102 and PRU 104.

FIG. 1B illustrates in more detail PTU 102 transmitting power to a PRU 104. As shown in FIG. 1B, PTU 104 includes a power source 106, an amplifier 108, and matching circuits 110. PTU 104 drives a transmit resonator 112. Power source 106 can be any source of power at the operating frequency of PTU 104, for example the 6.78 MHz in conformance with the A4WP standard. Power source 106 may use wall power (e.g. 110V at 60 Hz), may be battery powered, or may input other DC or AC sources of power. Amplifier 108 can adjust the voltage supplied to matching circuits 110 in order drive transmit resonator 112. Matching circuit 110 matches the impedance of transmit resonator 112. Transmit resonator 112 includes a coil, which may be embedded in a mat or table on which PRU 104 is placed.

As shown in FIG. 1B, PRU 104 receives power at receive resonator 116. Receive resonator 116 may be much smaller than transmit resonator 112 so that multiple ones of receive resonator 116 can be placed in proximity to transmit resonator 112 in order to receive power. Power received in receive resonator 116 is input to regulator 118, which provides DC power to DC-DC converter 120. DC-DC converter 120 provides power to a load 122, which corresponds to the user device to be charged.

In some embodiments, a separate communications channel is provided between PRU 104 and PTU 102. Signaling 126 of PRU 104 is in communications with signaling 124 in PTU 102. In some embodiments, communications can be performed by modulating the power link between receiver resonator 116 and transmit resonator 112. Communications between signaling 126 and signaling 124 can be, for example, by Bluetooth or other wireless link.

FIG. 2 illustrates a PTU 200 according to some embodiments of the present invention. As shown in FIG. 2, a pre-regulator 202 receives a voltage Vin and provides current through an inductor 204 to a center tap of inductor 216, which forms a transformer with inductor 206. A first end of inductor 216 is coupled through transistor 210 to ground while the opposite end of inductor 216 is coupled through transistor 208 to ground. A first capacitor 214 is coupled between the source and drain of transistor 210 while a second capacitor 212 is coupled between the source and drain of transistor 208. In some embodiments, transistors 208 and 210 can be power FETs. Although transistors 208 and 210 can be any FETs, in some embodiments transistors 208 and 210 can be GaN FETs.

Inductor 216 is magnetically coupled to inductor 206, forming a transformer. Power from inductor 216 drives PTU resonator circuit 222. PTU resonator circuit 222 includes a capacitor 218 coupled between inductor 216 and resonator coil 220. PTU resonator circuit 222 completes the resonant transmission of wireless power from PTU 200. Coil 220 in resonator circuit 222 can be sized to cover an area to accommodate a number of PRUs 104.

Transistors 208 and 210 are driven to alternately couple each side of inductor 216 to ground, though in some cases this may be through a current sense resistor (not shown). Transistors 208 and 210 can be driven at or near the resonant frequency of resonant circuit 222, for example 6.78 MHz as provided for in the A4WP standard. Current supplied by pre-regulator 202 is then alternately switched across inductor 216, inducing power in resonant 222 at the switching frequency.

In some embodiments, pre-regulator 202 can actively control power transmitted by coil 220 by controlling the output current through inductor 204. In some embodiments, pre-regulator 202 may control the power transmitted by PTU resonator circuit 222 in accordance with power requirements received by one or more PRUs 104. In some embodiments, pre-regulator 202 may control the power transmitted by PTU resonator circuit 222 in response to detected conditions, for example currents, detected in various locations in PTU 200.

Figure 3:
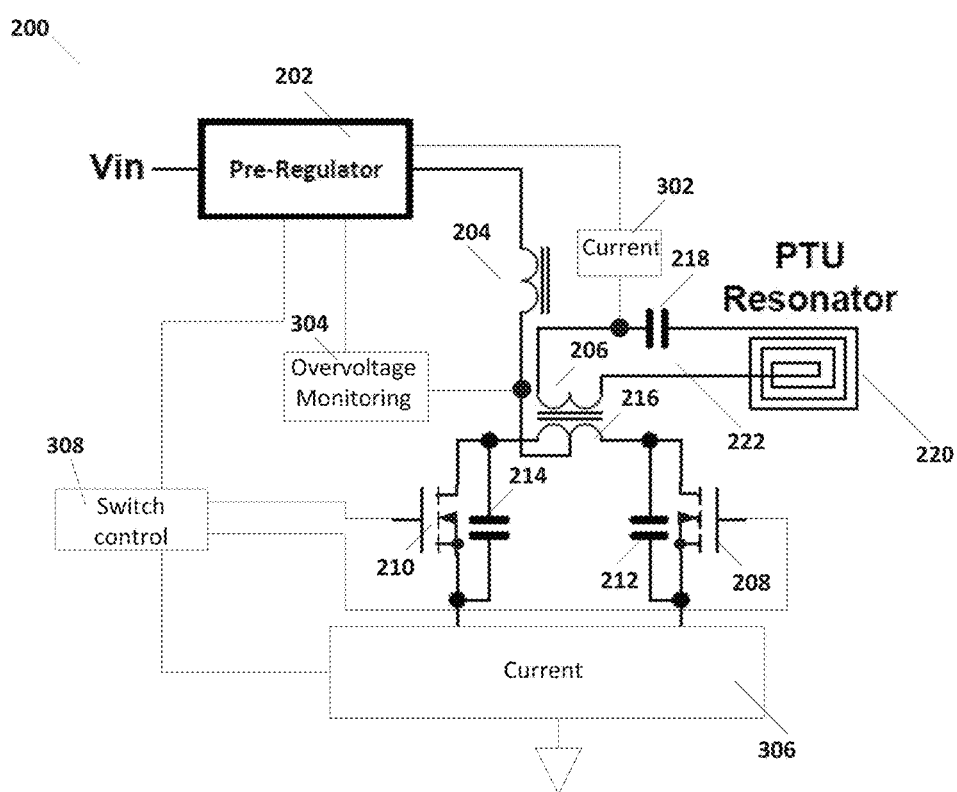
FIG. 3 illustrates a detailed diagram of a wireless power transmitter corresponding with the block diagram illustrated in FIG. 2.

FIG. 3 further illustrates PTU 200. As shown in FIG. 3, a current detector 302 can detect the current in resonator circuit 222. In some embodiments, current detector 302 can include a rectifier circuit in order to produce a current signal for pre-regulator 202. Pre-regulator 202 can then compare the current signal with a threshold signal and increase the current through inductor 204 accordingly.

Another current sensor 306, which detects current through transistors 208 and 210, can also be used to adjust the current through inductor 204. In some embodiments, a voltage from current sensor 306 can be compared to a threshold voltage that is set in response to a voltage from current sense 302 in a dual current feedback loop system. In some embodiments, the first current signal from current sensor 302 and the second current signal from current sensor 304 are averaged so that the feedback loops are operated in average current mode control. In some embodiments, the current or voltage at other locations in PTU 200 can be monitored in pre-regulator 202 and adjustments made in response to those currents.

As is further illustrated in FIG. 3, an over-voltage control monitor 304 can detect the current through inductor 204 or voltage at inductor 204. A current signal from monitor 304 can also be input to pre-regulator 202. Various other current or voltage sensors can be provided in PTU 202 to monitor and control the operation of PTU 202.

As is further shown in FIG. 3, a switch control circuit 308 drives the gates of transistors 210 and 212. As discussed above, switch control circuit 308 drives the gates of transistors 208 and 210 at or near the resonant frequency of the resonant circuit 222. As such, switch control 308 can include a voltage controlled oscillator circuit or a similar circuit. In some embodiments, switch control 308 can operate a fixed frequency, such as the 6.78 MHz of the A4WP standard for example. Switching at the resonant frequency can result in zero switching losses in the PTU 200. Current sensor 306 can measure the current that is flowing through transistors 210 and 208 and provide a switching current signal to switch control 308, which may be used to adjust the switching frequency of transistors 208 and 210. The switching current signal from current sensor 306 can further be used in pre-regulator 202 in a comparison with the second current signal from current sensor 304. The comparison, as discussed above, can be used to adjust the threshold voltage.

Figure 4:
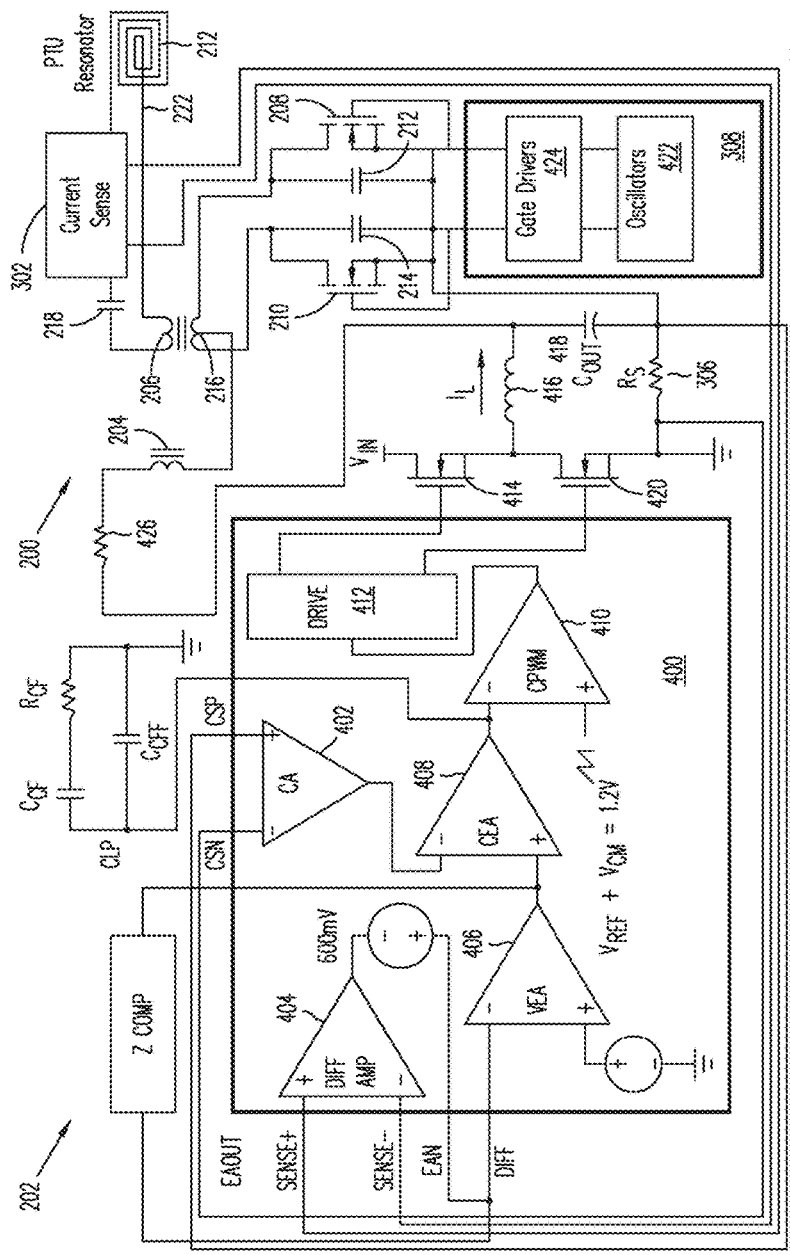
FIG. 4 illustrates another block diagram of a wireless power transmitter corresponding with the block diagram illustrated in FIG. 2.
Figure 5A:
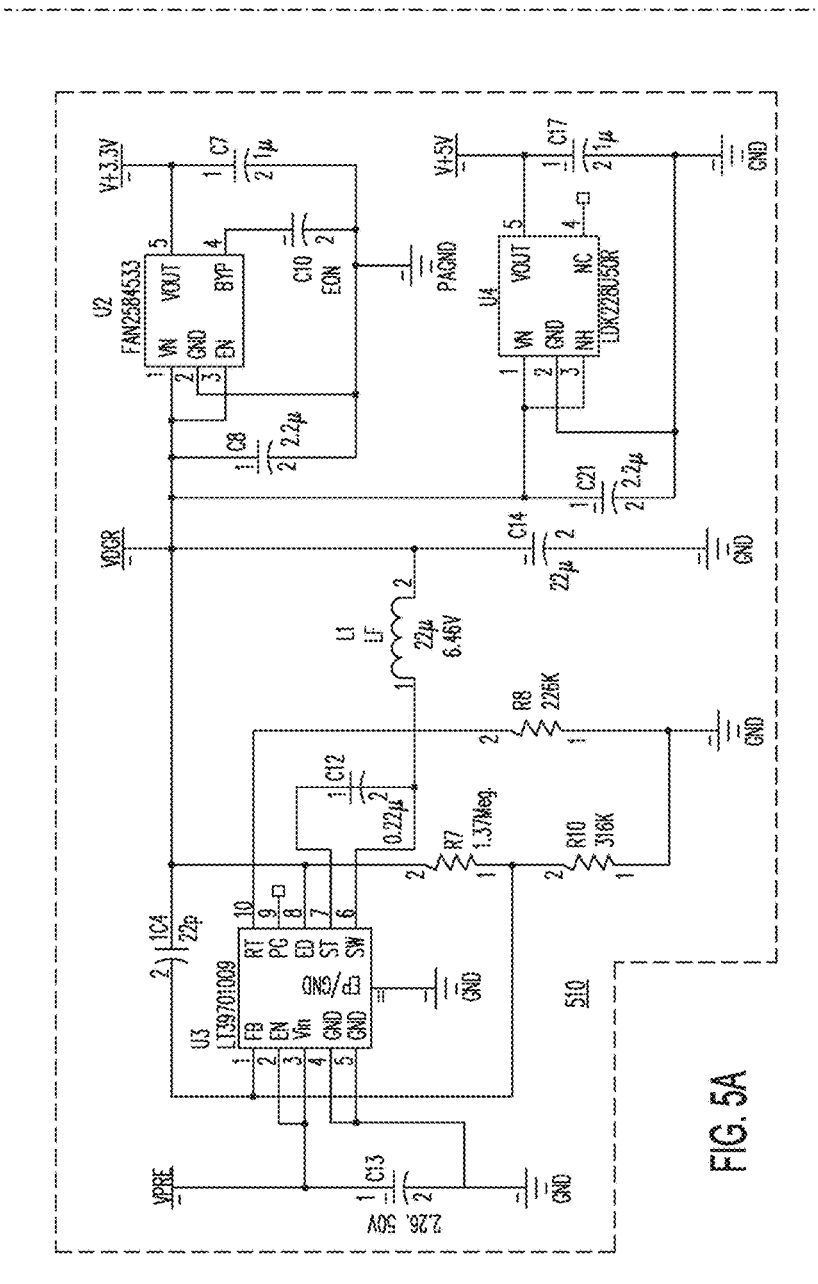
FIG. 5 (consisting of FIGS. 5A, 5B, 5C, 5D, 5E, 5F and 5G) illustrates a detailed diagram of a wireless power transmitter corresponding with the block diagram illustrated in FIG. 2.
Figure 5B:
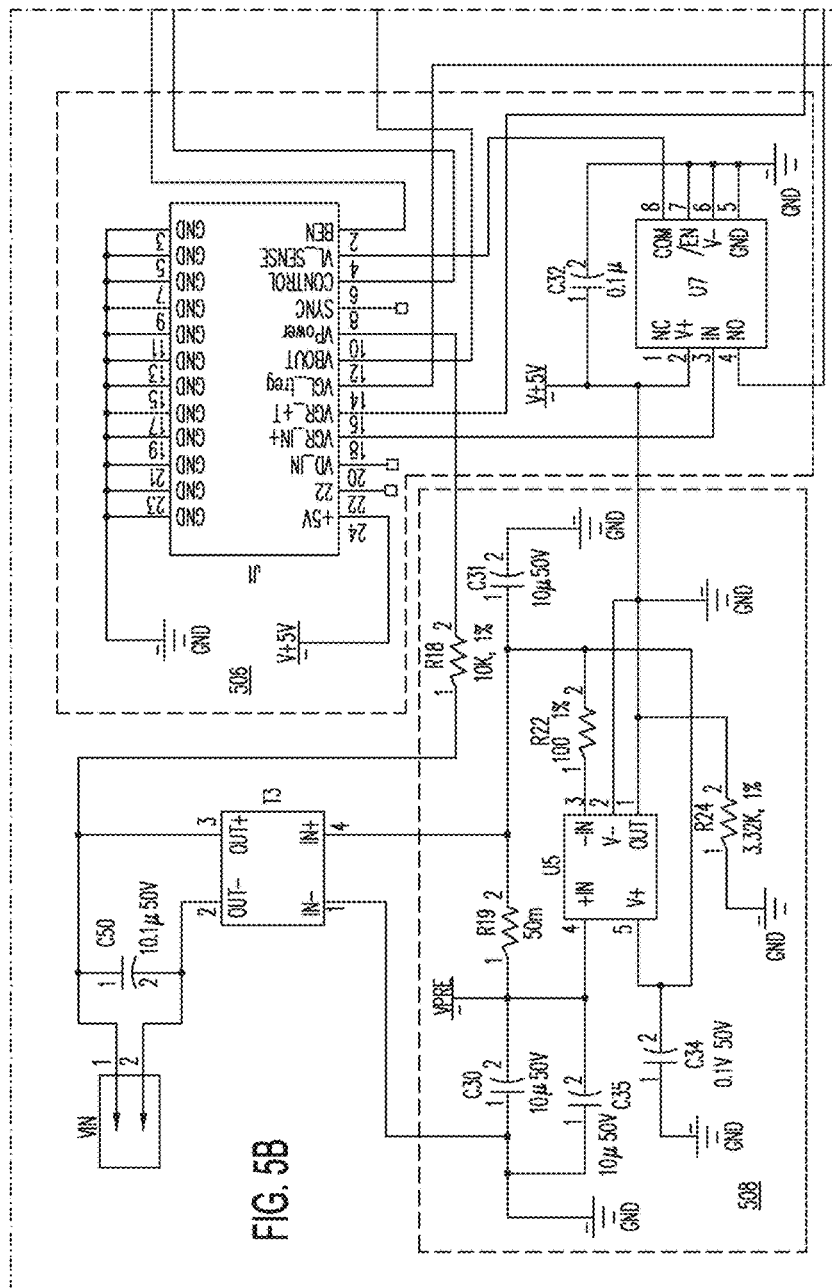
Figure 5C:
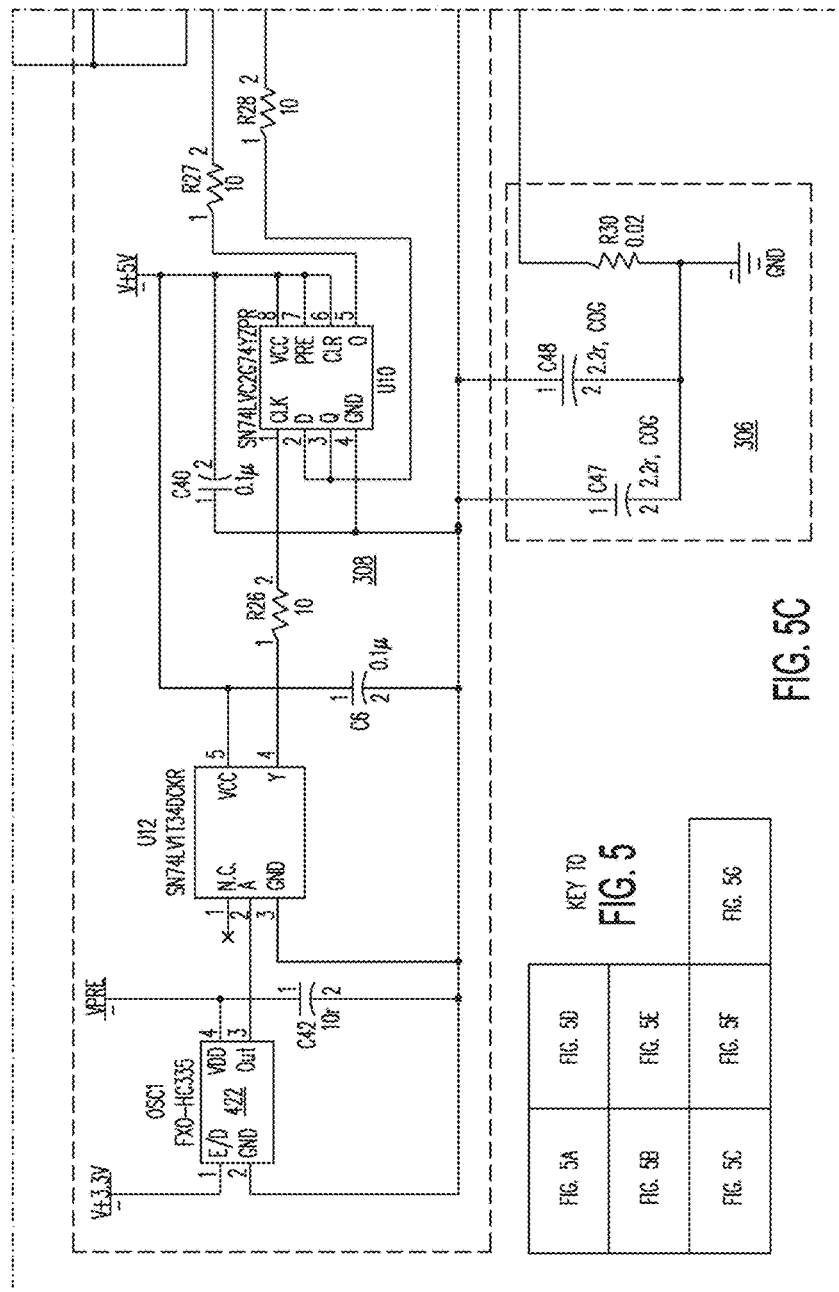
Figure 5E:
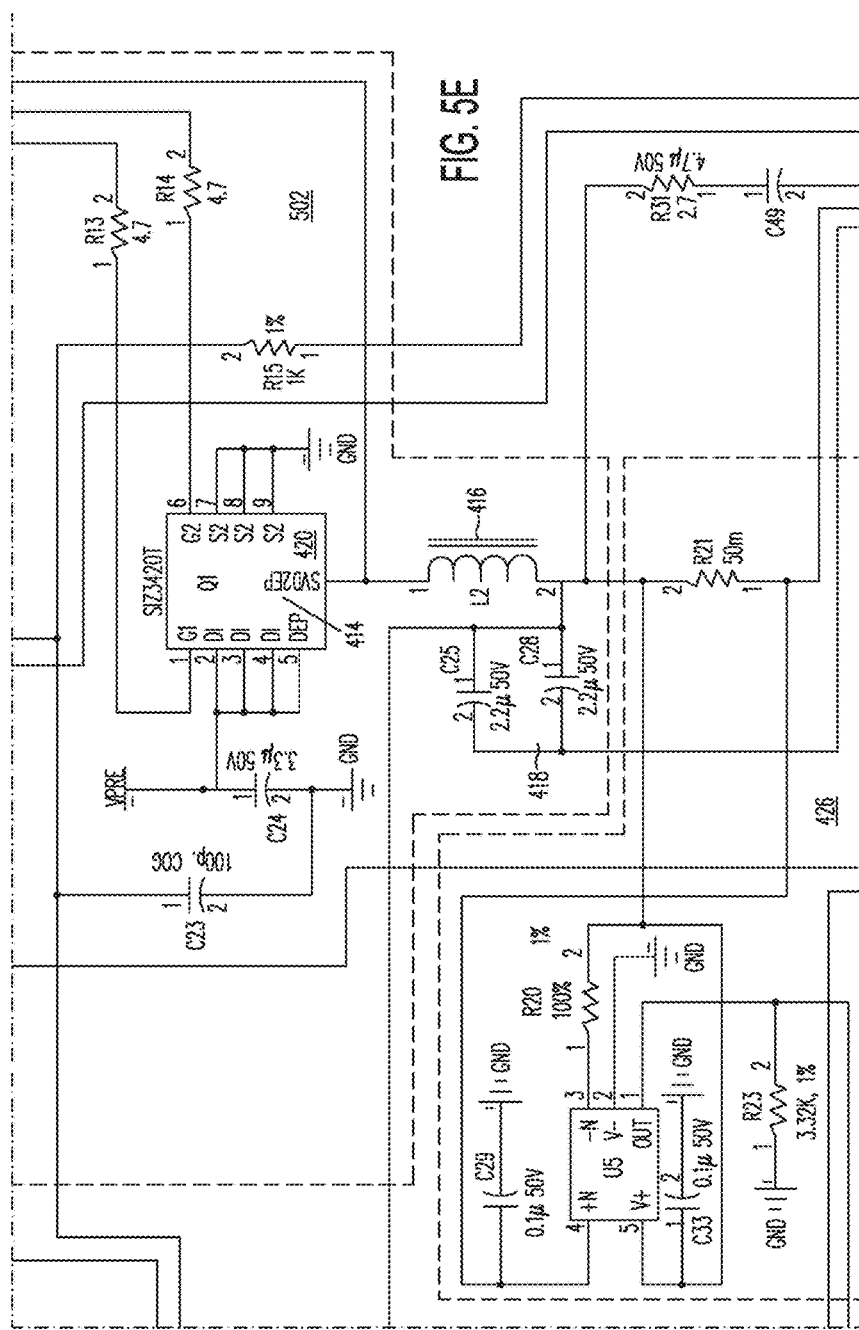
Figure 5F:
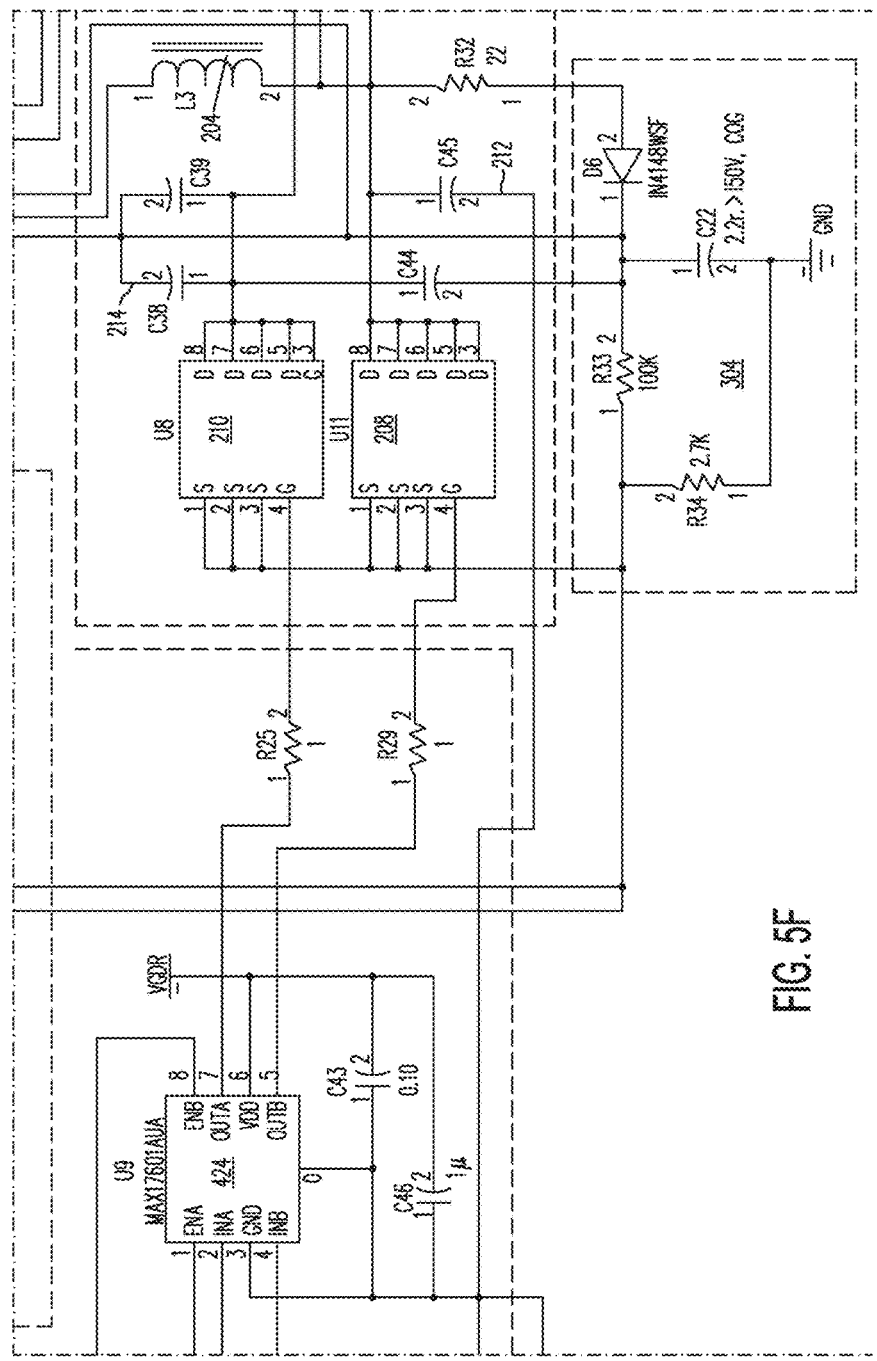
Figure 5G:
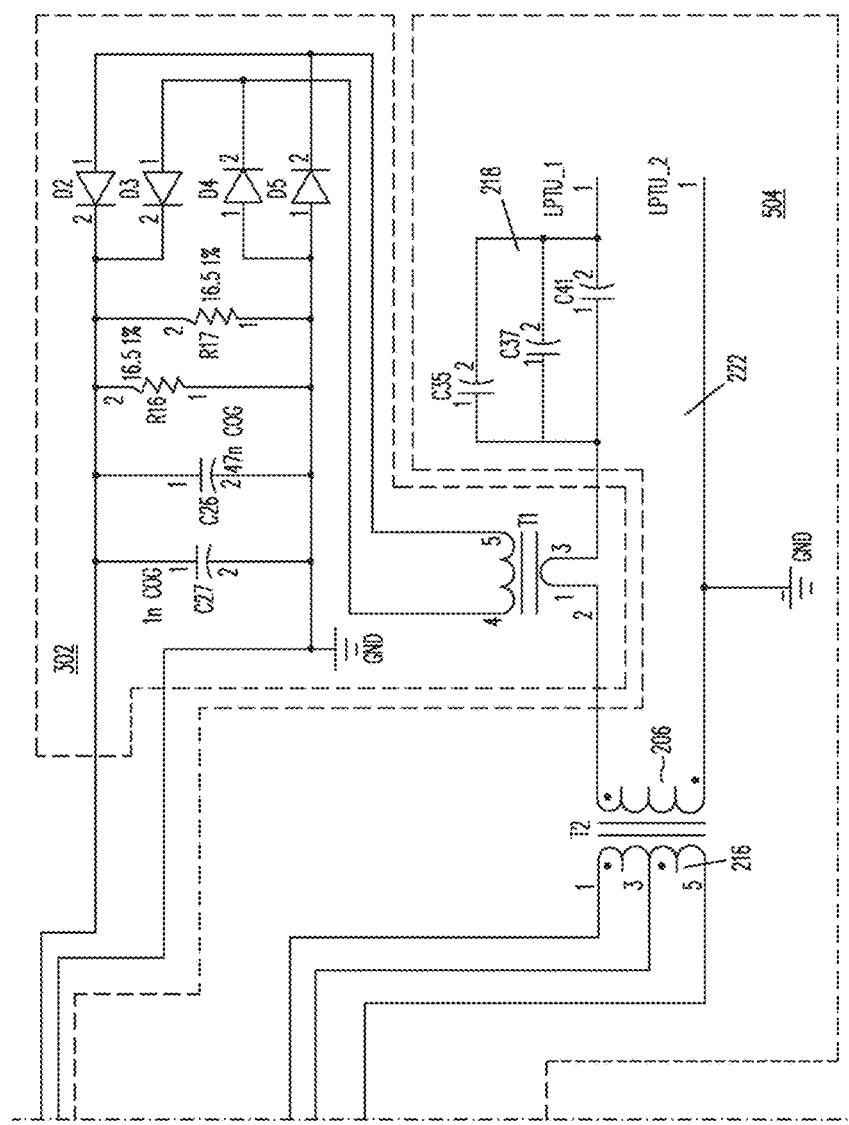

FIG. 4 illustrates an example of PTU 200 that uses average current mode control for controlling the power output of PTU resonator coil 220. As shown in FIG. 4, pre-regulator 202 includes two control loops, an inner current loop for controlling the inductor current and an outer current loop for regulating the current through resonant circuit 222. As shown in FIG. 4, pre-regulator 202 includes a buck regulator with driven transistors 414 and 420 coupled to inductor 416 and capacitor 418. The inner current loop receives a signal from current sensor 306, which monitors the current through inductor 416 and capacitor 418, into current-sense amplifier 402. Current sense amplifier 402 provides a signal to current-error amplifier 408. Current-error amplifier provides a signal to a pulse wave modulator comparator 410, which also receives a signal from a ramp generator (not shown). The precision current amplifier 402 amplifies the voltage difference across resistor Rs of current sense 306, which is sensed by the inverting input of the current error amplifier 408. Current error amplifier 408 outputs the difference between the output of the current amplifier 402 and the output of a voltage error amplifier 406. The output signal from current error amplifier 408 may be coupled to a current frequency compensator. At the start of every clock cycle, driver 412 enables transistor 414 and initiates a pulse-wave modulation on-cycle. Comparator 410 compares the output voltage from the current error amplifier 408 with the ramp voltage and, when the ramp voltage exceeds the voltage output of current error amplifier 408, signals drive 412 to turn transistor 414 off and turn transistor 420 on, ending the on cycle.

The outer current loop includes a differential amplifier 404, which receives input signals from current sense 302. The output signal from differential amplifier 404 is coupled to the input of voltage error amplifier 406, which provides the second input to current error amplifier 408. voltage error amplifier 406 compares the output signal from differential amplifier 404 with a threshold and, in turn, provides a threshold to current error amplifier 408 for comparison with the output signal from current amplifier 402.

Consequently, the output voltage supplied to inductor 204 is adjusted by the currents sensed in the resonant circuit 222, the current flowing through inductor 204, and the current flowing through transistors 210 and 208. As shown in FIG. 4, in some embodiments multiple components of the system can be implemented on a control chip 400. In some embodiments, control chip 400 can be a high efficiency PWM controller such as that provided by Maxim Integrated LED Driver MAX16818, for example.

Other sensors may also be utilized. For example, FIG. 4 illustrates a sensor 426 monitoring the current between inductor 416 and inductor 204. Further, monitoring 304, which is not shown in FIG. 4, may also be used.

As is further illustrated in FIG. 4, switch control 308 can include an oscillator 422 and gate drivers 424. Oscillator 422 provides an alternating voltage at or near the resonant frequency of resonance circuit 222 while gate drivers 424 drive the gates of transistors 208 and 210 accordingly.

FIG. 5 illustrates a complete circuit diagram that implements PTU 202 as described in above with FIG. 2 through FIG. 4. FIG. 5 illustrates in detail the configuration PTU 200. Component values and chip designations provided on FIG. 5 are examples only and are not intended to be limiting in any way.

The embodiment of PTU 200 illustrated in FIG. 5 includes a control block 502. Control block 502 includes driver chip 400, transistors 414 and 420, inductor 416, and capacitor 418. Control block 502 drives resonance block 504, which includes FETs 208 and 210, inductors 216, and resonant circuit 222. As shown in FIG. 5, sensor 302 includes an inductor pickup and rectifier that receives a current signal from resonance circuit 222. As is further shown, over voltage monitor 304 monitors the voltage at the center tap of inductor 216. Current sense 306 monitors the current through inductor 416. A sensor 426, as shown in FIG. 4, also monitors the current between inductor 416 and inductor 204.

Pre-regulator 202 includes, in addition to control block 502, a regulator/filter 508 that filters and regulates the input voltage, regulator 510 that provides regulated power to PTU 200. Additionally, a microprocessor can be connected to a connector 506 which serves as the connector to a processor. A Processor receives signals from sensor 426, monitor 304, sensor 306, and other sensors and provides control signals to control block 502 through connector block 506.

As is further shown in FIG. 5, oscillator 422 of switch control 308 can be a fixed oscillator, although an oscillator with a controllable frequency may also be used.

The above detailed description is provided to illustrate specific embodiments of the present invention and is not intended to be limiting. Numerous variations and modifications within the scope of the present invention are possible. The present invention is set forth in the following claims.

What is claimed is:

1. A wireless power transmitter, comprising:
   a resonant circuit, the resonant circuit including a transmit coil;
   a transformer with a primary inductor and a secondary inductor connected to the resonant circuit, the primary inductor including a center tap, a first end tap, and a second end tap;
   a switching circuit that alternately couples the first end tap and the second end tap to ground; and
   a regulator coupled to the center tap, the regulator configured to control a power level of power transmitted by the transmit coil, in response to power requirements received from a wireless power receiver and errors detected in a current level of the primary inductor.

2. The wireless power transmitter of claim 1, wherein the regulator controls the power level in response to a signal received from a receiver coupled to receive power transmitted by the transmit coil.

3. The wireless power transmitter of claim 1, wherein the switching circuit includes a first transistor coupled between the first end tap and ground and a second transistor coupled between the second end tap and ground, wherein gates of the first transistor and the second transistor are activated to provide an alternating current through the primary inductor at a frequency.

4. A wireless power transmitter, comprising:
   a resonant circuit, the resonant circuit including a transmit coil;
   a transformer with a primary inductor and a secondary inductor connected to the resonant circuit, the primary inductor including a center tap, a first end tap, and a second end tap;
   a switching circuit that alternately couples the first end tap and the second end tap to ground; and
   a regulator coupled to the center tap, the regulator configured to control a power level of power transmitted by the transmit coil, wherein the regulator comprises:
   a current error amplifier;

a first current loop, the first current loop including a current amplifier that amplifies a difference between signals from a current sensor and provides a signal to the current error amplifier;

a second current loop, the second current loop including a differential amplifier amplifying a signal from a current sensor and providing a second signal to the current error amplifier;

a comparison pulse wave amplifier receiving an output signal from the current error amplifier and a ramp signal; and a driver that drives a transistor pair to supply power to an inductor capacitor pair while output of the current error amplifier exceeds the ramp signal.

5. The wireless power transmitter of claim 4, wherein at least one of the first current loop and the second current loop includes average current mode control.

6. A wireless power transmitter, comprising:
means for receiving power requirements and feedbacks from a wireless power receiver;
means for controlling current coupled into a center tap of a primary inductor of a transformer to control a power transmitted to the wireless power receiver;
means for sensing errors in controlling current, in response to the feedbacks from the wireless power receiver;
means for switching outer ends of the primary inductor; and
means for transmitting wireless power through a transmit coil inductively coupled to the primary inductor of the transformer.

7. The wireless power transmitter of claim 6, further including means for adjusting the current in the means for controlling current according to a signal received from the wireless power receiver.

8. A method of transmitting wireless power comprising:
coupling a transmit coil to a secondary inductor of a transformer;
controlling current supplied to a center tap of a primary inductor of the transformer, in response to errors detected in a current level of the primary inductor;
switching a first end tap of the primary inductor to ground at a frequency; and
switching a second end tap of the primary inductor at the frequency such that the first end tap and the second end tap are alternately coupled to ground,
wherein a power level of power transmitted by the transmit coil is controlled, in response to power requirements and feedbacks from a wireless power receiver.

9. The method of claim 8, wherein controlling current supplied to the center tap includes adjusting the current in response to a signal received from a receiver coupled to receive power transmitted by the transmit coil.

10. The method of claim 8, wherein switching the first end tap includes controlling a gate of a first transistor coupled between the first end tap and ground.

11. The method of claim 10, wherein switching the second end tap includes controlling a gate of a second transistor coupled between the second end tap and ground.

* * * * *